United States Patent
Hugenroth et al.

(10) Patent No.: US 8,068,970 B2
(45) Date of Patent: Nov. 29, 2011

(54) METHOD OF OPERATION FOR AN INTERNAL COMBUSTION ENGINE

(76) Inventors: Ludger Hugenroth, Ostbevern (DE); Herbert Twiefel, Harseninkel (DE); Heinrich Isfort, Dülmen (DE)

(*) Notice: Subject to any disclaimer, the term of this patent is extended or adjusted under 35 U.S.C. 154(b) by 201 days.

(21) Appl. No.: 12/423,841

(22) Filed: Apr. 15, 2009

(65) Prior Publication Data
US 2010/0268434 A1 Oct. 21, 2010

(30) Foreign Application Priority Data
Apr. 23, 2008 (DE) .......................... 10 2008 020 497

(51) Int. Cl.
*F02D 45/00* (2006.01)
*F02D 41/00* (2006.01)
(52) U.S. Cl. ...................................................... 701/102
(58) Field of Classification Search .................. 701/102, 701/111, 115, 56; 123/350, 352; 477/43, 477/47, 406
See application file for complete search history.

(56) References Cited

U.S. PATENT DOCUMENTS

| | | | | |
|---|---|---|---|---|
| 6,181,020 B1 * | 1/2001 | Uchida et al. | ............... | 290/40 C |
| 6,959,241 B2 * | 10/2005 | Itow et al. | .................... | 701/102 |
| 7,373,239 B2 * | 5/2008 | Kamado et al. | ............... | 701/103 |

* cited by examiner

*Primary Examiner* — Hieu T Vo
(74) *Attorney, Agent, or Firm* — Christine Johnson; Sterling Run, LLC

(57) ABSTRACT

A method of operation for an internal combustion engine (1) whose output power can be controlled by means of a controlling parameter (T), in which an engine characteristic curve (11, 12) which, at a value of the controlling parameter (T) which corresponds to a maximum output power, specifies the output power (P) as a function of the engine's speed of revolution ($\omega$), has an ascending part (12) at low speeds of revolution and a descending part (11) at high speeds of revolution, is characterized in that if, when the engine (1) is operating, the speed of revolution ($\omega$) exceeds a first upper limiting value ($\omega_{max,0}$) at the value of the controlling parameter which corresponds to the maximum output power, a first value ($T_1(\omega)$) of the controlling parameter (T) is set which corresponds to a reduced output power.

10 Claims, 2 Drawing Sheets

METHOD OF OPERATION FOR AN INTERNAL COMBUSTION ENGINE

BACKGROUND OF THE INVENTION

The present invention relates to a method of operation for an internal combustion engine, and in particular a high-powered Diesel engine, for use in agricultural machines.

SUMMARY OF THE INVENTION

A method of operation for an internal combustion engine (1) whose output power can be controlled by means of a controlling parameter (T), in which an engine characteristic curve (11, 12) which, at a value of the controlling parameter (T) which corresponds to a maximum output power, specifies the output power (P) as a function of the engine's speed of revolution ($\omega$), has an ascending part (12) at low speeds of revolution and a descending part (11) at high speeds of revolution, is characterised in that if, when the engine (1) is operating, the speed of revolution ($\omega$) exceeds a first upper limiting value ($\omega_{max,0}$) at the value of the controlling parameter which corresponds to the maximum output power, a first value ($T_1(\omega)$) of the controlling parameter (T) is set which corresponds to a reduced output power.

DESCRIPTION OF THE DRAWINGS

Other features and advantages of the invention can be seen from the following description of embodiments, which refers to the accompanying drawings. In the drawings.

DETAILED DESCRIPTION

Figure 1:
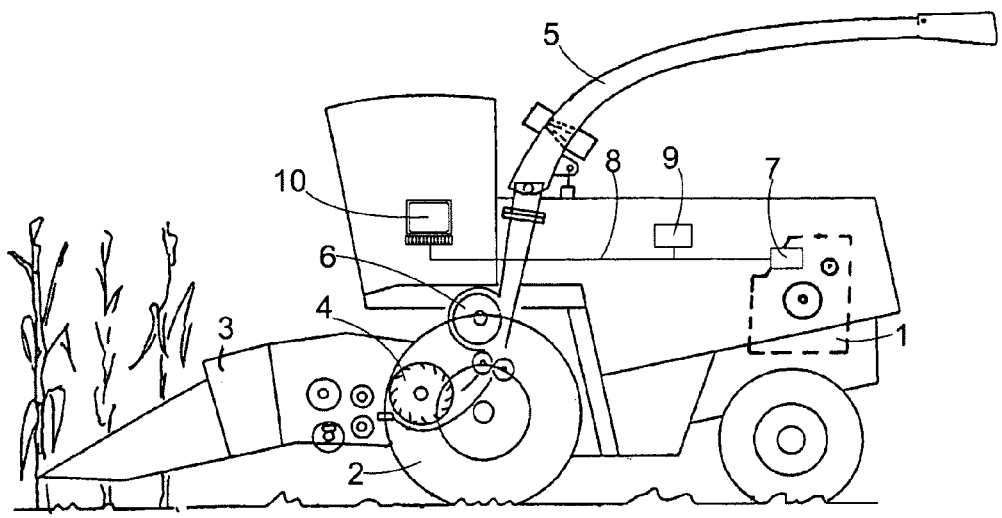
FIG. 1 is a schematic view of a forage harvester.

The engines of self-propelled agricultural machines such as, say, forage harvesters, combine harvesters and the like are conventionally operated at continuous full power when used in the field, i.e. the operating point of the engine, defined by its speed of revolution and output power, moves along a characteristic curve which has an ascending part at low speeds of revolution in which the output power increases with the speed of revolution and a descending part at high speeds of revolution where the output power decreases. The output power which the chopping mechanism of a forage harvester for example asks for from the engine is proportional to the throughput of harvested crop and consequently to the speed of travel on the field which is being worked and to the density of the crop for harvesting on it, whereas the output power required for the movement of the forage harvester is always substantially proportional to its speed. It is open to the driver to affect the speed of travel of the forage harvester by the way in which the engine output power is distributed between the running gear and the chopping mechanism.

If at low speed the throughput of harvested crop is low, the power consumed is low and the speed of revolution of the engine and the speed of travel rise until a steady-state value is reached on the descending part of the engine's characteristic curve at which the output power from the engine and the power asked for by the running gear and chopping mechanism together are in balance with each other. The higher is the said speed of revolution, the higher is the ratio between the fuel consumed and the work done, i.e. the more uneconomical does operation become. The driver must therefore be at pains to distribute the output power to the running gear and the chopping mechanism in such a way that the speed of revolution which is settled to is in an economical range close to the crest of the engine's characteristic curve. In the conventional case however this is not possible if for example there are constraints which limit the driver's freedom to decide, because say the speed of the forage harvester has to be kept equal to that of an accompanying vehicle to which the chopped harvested crop is being continuously transferred, or if the output power required varies and the driver does nothing to adjust to follow the variation.

It is an object of the present invention to provide a method of operation for an internal combustion engine which makes economical, fuel-saving operation possible even when there are adverse constraints.

The way in which this object is achieved, in the case of an internal combustion engine whose output power can be controlled by means of a controlling parameter, and where an engine characteristic curve, which engine characteristic curve, at a value of the controlling parameter which corresponds to a maximum output power, defines the output power as a function of the engine's speed of revolution, has an ascending part at low speeds of revolution and a descending part at high speeds of revolution is that if, when the engine is operating, the speed of revolution exceeds a first upper limiting value at the value of the controlling parameter which corresponds to the maximum output power, a first value of the controlling parameter is set which corresponds to a reduced output power.

This first value of the controlling parameter which corresponds to a reduced output power is preferably preset as a function of the speed of revolution of the engine, this being done in such a way that, if the engine is operated with the first value which corresponds to the current speed of revolution, a decrease in engine output power is obtained as the speed of revolution rises. In this way fluctuations in speed of revolution which result from fluctuations of the output power required for the sub-assemblies driven by the engine or from fluctuations in the speed of a vehicle driven by the engine can be kept low, and there is little risk of the engine being stalled by a sudden increase in the output power required.

Conversely if, when operating with the first value of the controlling parameter, the speed of revolution drops below a first lower limiting value for speed of revolution, the value of the controlling parameter which corresponds to the maximum output power is preferably again set, and a high engine output power thus becomes available again as soon as it is needed.

The controlling parameter can preferably be switched between a plurality of levels, i.e. if in operation with the nth value of the controlling parameter, where n may be any whole-number value between 1 and an upper limit, an n+1th upper limiting value for speed of revolution is exceeded, an n+1th value of the controlling parameter which corresponds to a reduced output power is usefully set, the output power which corresponds to the n+1th value of the controlling parameter being lower than that which corresponds to the n+1th value.

In this case too, the nth value of the controlling parameter which corresponds to a reduced output power is usefully set again if the speed of revolution drops below an n+1th lower limiting value for speed of revolution when operating at the nth value of the controlling parameter.

To allow a significant decrease in speed of revolution which results in an appreciable reduction in fuel consumption to be obtained by means of the change in the controlling parameter, the difference between the output power from the engine at the value of the controlling parameter which corresponds to the maximum output power and that at the first value which corresponds to reduced output power, and/or the difference between the output power from the engine at the nth value of the controlling parameter and at its n+1th value should, for a preset engine speed of revolution, be at least 10 kW or at least 2% of the engine output power at the crest of the engine characteristic curve.

To avoid unnecessarily frequent changes of the controlling parameter, the nth lower limiting value should be a maximum of 90% of the nth upper limiting value.

What may serve as a controlling parameter is the amount of a consumable such as, say, fuel or fresh air which is fed in; what it preferably is is the torque generated by the engine.

Control by using torque as a controlling parameter can be achieved with particular ease if use is made of an electronically controlled engine able to be operated under the standardised SAE J1939 protocol, because this protocol makes provision for an upper limit of the torque able to be put out by the engine to be a controlling parameter.

The invention also relates to a control unit for an internal combustion engine which is set up to carry out the method defined above, and to an agricultural machine having an internal combustion engine and a control unit of this kind.

In particular, the control unit may be implemented in the form of a suitably programmed microprocessor or microprocessor system; the invention therefore also relates to a computer program having source code means for carrying out the method describe above on a microprocessor of an engine control unit, and to a computer-readable data carrier on which programmed instructions are recorded which enable a computer to carry out the method described above. FIG. 1 shows, as an embodiment of the present invention, a schematic view of a self-propelled forage harvester. Via a transfer gearbox (not shown) which is known per se, a Diesel engine 1 drives on the one hand running gear 2 and on the other hand blades of a front-mounted harvesting attachment 3, a chopping drum 4 for comminuting the plant material picked up by the front-mounted harvesting attachment 3, and a post-accelerator 6 which gives the chopped plant material the speed it requires to travel through a discharge chute 5 and to be transferred to an accompanying vehicle (not shown).

The Diesel engine 1 is connected via an SAE J1939 interface to a CAN bus 8 via which various electronic control facilities such as, say, a control processor 9 and a user interface 10 in the driver's cab are able to communicate. The SAE J1939 protocol makes provision for the engine 1 to be controlled by means of 8-byte long command words which allow a choice to be made between various modes of control and which allow desired and limiting values to be preset for the speed of revolution or torque of the engine. The SAE interface 7 meters the fuel which is fed to the engine 1 in line with a preset desired value which it receives via the bus 8. If a preset desired value would result in an engine speed of revolution which was higher than is allowed, it performs a limitation of speed of revolution and in this way implements a limit characteristic curve 11 of the kind shown in FIG. 3.

Figure 2:
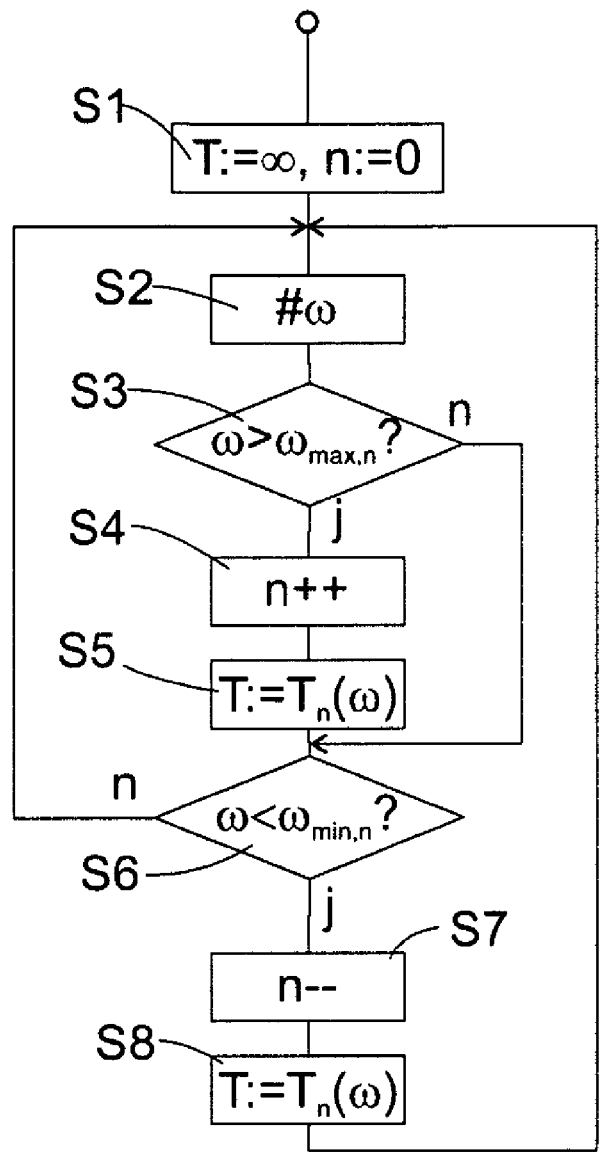
FIG. 2 is a flow chart of the method according to the invention.

A method of operating the engine 1 which is carried out by the control processor 9 is shown as a schematic flow chart in FIG. 2. Each time the engine 1 is started, a limiting value T for torque which is to be transmitted to the engine 1 is set to infinity in step S1, i.e. there is not to be any limit set for torque, and an index number n is set to 0. In step S2 the speed of revolution ω of the engine 1 is sensed, and in step S3 a check is made to see whether the value sensed exceeds an upper limiting value $\omega_{max,n}$ which is specific to the current value of the index number n. If this is not the case, the method jumps to step S6; if on the other hand the limiting value is exceeded, the index number n is incremented in step S4, and in step S5 a limiting value T for torque is laid down as a function $T_n(\omega)$ of the speed of revolution ω and is taken into account in the ongoing operation of the engine 1.

The functions $T_n$ are decreasing functions of the speed of revolution ω, the relationship $T_{n(\omega)} < T_{n-1(\omega)}$ being satisfied for all values of n greater than 2.

Then, in step S6, the speed of revolution ω which is sensed is compared with a lower limiting value $\omega_{min,n}$. If the speed of revolution ω is not below this limiting value, the method goes back to step S2. For n=0 the limiting value $\omega_{min,0}$ is set to 0, which means that the condition queried in step S6 can only be met when n>0. If it is met, the number index n is decremented in step S7, and in step S8 a new upper limit $T = T_n(\omega)$ for torque is laid down in line with the new value of n, where $T_{0(\omega)} = \infty$.

What apply to each lower limiting value where n≧1 are: $\omega_{min,n} < 0.9\, \omega_{max,n}$ and $\omega_{min,n} < 0.9\, \omega_{max,n-1}$. What also apply are $\omega_{max,n} > \omega_{max,n-1}$ and $\omega_{min,n} > \omega_{min,n-1}$.

The effects of control by the method shown in FIG. 2 will be explained by reference to the graph shown in FIG. 3.

Figure 3:
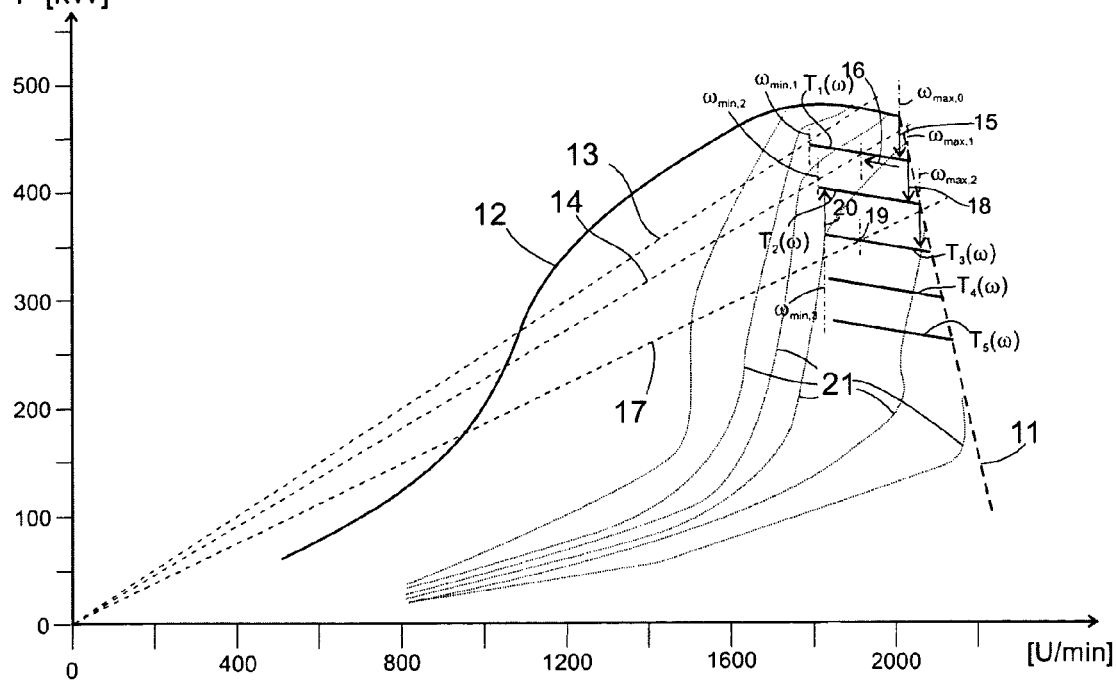
FIG. 3 is a graph of a characteristic curve to show the effect of the method.

In the graph shown in FIG. 3, the engine's speed of revolution ω is plotted along the x axis and the engine output power P is plotted along the y axis. A characteristic curve which defines the connection between speed of revolution and output power when the engine 1 is at full load is identified by reference numeral 12. This full-load characteristic curve 12 has a crest at approximately 1800 rpm and at 2000 rpm it intersects the limit characteristic curve 11.

To allow the behaviour of the engine and its control system to be explained, it can be assumed that when an area in which the density of the standing crop is constant is being harvested, the driving power required for the travel drive and the chopping mechanism is proportional to the speed of the vehicle and hence to the speed of revolution. What this means is that if the engine is operating at full load, an operating point is obtained which is at the intersection of the full-load characteristic curve 12 and a straight line 13 representative of the power consumed by the drive and the chopping mechanism. If the power demand decreases, because for example less power is required at the chopping mechanism due to a local reduction in the density of the standing crop for harvesting, then the gradient of the straight line 13 becomes shallower, and what results is for example the line identified by reference numeral 14, and the operating point shifts to higher speeds of revolution. The limiting value $\omega_{max,0}$ for speed of revolution is situated at the intersection between the full-load characteristic curve 12 and the limit characteristic curve 11 or slightly below it. If this speed of revolution $\omega_{max,0}$ is reached or exceeded, the control processor 9 limits the torque from the engine 1 to $T_1(\omega_{max,0})$ and the output power from the engine goes down, as indicated by an arrow 15. The engine output power is now less than that required to maintain the speed of revolution $\omega_{max,0}$. The speed of revolution ω goes down, and the operating point moves (arrow 16) along the characteristic curve segment identified as T1 until it again reaches a steady-state value at the intersection with the straight line 14.

In the event of an even greater decrease in the outer power consumed by the forage harvester, such for example as one represented by the straight line 17, the speed of revolution continues to increase even after the changeover to the characteristic curve segment T1 and finally exceeds the limiting value $\omega_{max,1}$. At this point the control processor 9 once more reduces the maximum torque from the engine 1, as indicated by an arrow 18. The speed of revolution nevertheless continues to rise and even exceeds the limiting value $\omega_{max,2}$, whereupon the control processor 9 again reduces the torque, this time to $T_3(\omega_{max,2})$. The characteristic curve segment $T_3(\omega)$ intersects the straight line 17, which means that a steady-state operating point 19 is once again reached on it.

If the power asked for by the chopping mechanism increases again, the operating point shifts to lower speeds of revolution and as soon as the speed of revolution drops to $\omega_{min,3}$ the control processor 9 switches back to the characteristic curve segment $T_2(\omega)$, as indicated by an arrow 20. As the power asked for increases, the engine 1 eventually changes back to operating on the full-load characteristic curve 12.

Whereas it is acceptable, and may even be desirable, for the control processor 9 to have a long response time when switching the output power down as shown by arrow 18, in order to prevent the output power being switched over because of brief, chance fluctuations in the load on the engine, the switch 20 to a higher level of output power should take place with as short a response time as possible, in order to rule out the possibility of an unwanted sag in the speed of revolution, which in extreme cases might even result in the engine stopping.

Shown in FIG. 3 are a total of five characteristic curve segments $T_n(\omega)$ but the number of segments may of course equally well be larger. The closeness at which the segments are graduated or, which amounts to the same thing, the mean difference in output power between them, is determined by, amongst other things, the requirement that, to allow a hysteresis in the changeover between the characteristic curve segments to be implemented, a straight line which extends through the co-ordinate origin and which intersects one of the segments close to its upper or lower limiting value should also intersect an adjacent segment. The optimum number of characteristic curve segments therefore depends both on their length (the difference between their upper and lower limiting values) and on their gradient.

A family of thin dotted lines 21 in the graph shown in FIG. 3 identify respective engine states with the same specific fuel consumption, the fuel consumption values to which the lines correspond increasing from left to right and from top to bottom in the graph. The characteristic curve segments $T_n(\omega)$ extend transversely to the consumption characteristic curves 21, which means that specific fuel consumption also goes down appreciably whenever the speed of revolution is reduced by a transition to a characteristic curve segment which applies a more severe limit on torque. As can easily be seen from FIG. 3, the fuel saving is all the more significant the greater is the reduction in speed of revolution which results from the lowering of the limiting values for torque. The characteristic curve segments $T_n(\omega)$ should therefore not be too closely graduated; a difference in output power between two adjacent segments should be at least 2% of the maximum output power from the engine or 10 kW. In the embodiment shown in FIG. 3 the difference in output power between two adjacent segments is approximately 40-50 kW.

REFERENCE NUMERALS

1 Diesel engine
2 Running gear
3 Front-mounted harvesting attachment
4 Chopping drum
5 Discharge chute
6 Post-accelerator
7 SAE interface
8 CAN bus
9 Control processor
10 User interface
11 Limit characteristic curve
12 Full-load characteristic curve
13 Straight line
14 Straight line
15 Arrow
16 Arrow
17 Straight line
18 Arrow
19 Operating point
20 Arrow
21 Line
$T_n(\omega)$ Characteristic curve segment

The invention claimed is:

1. Control unit for an internal combustion engine, characterised in that output power can be controlled by means of a controlling parameter (T), in which an engine characteristic curve (11, 12) which, at a value of the controlling parameter (T) which corresponds to a maximum output power, defines the output power (P) as a function of the engine's speed of revolution ($\omega$), has an ascending part (12) at low speeds of revolution and a descending part (11) at high speeds of revolution, characterised in that if, when the engine (1) is operating, the speed of revolution exceeds a first upper limiting value ($\omega_{max,0}$) at the value of the controlling parameter which corresponds to the maximum output power, a first value ($T_1(\omega)$) of the controlling parameter (T) is set which corresponds to a reduced output power.

2. Control unit according to claim 1, characterised in that it is set up to communicate with the internal combustion engine in accordance with standard SAE J1939.

3. Method of operation for an internal combustion engine (1) whose output power can be controlled by means of a controlling parameter (T), in which an engine characteristic curve (11, 12) which, at a value of the controlling parameter (T) which corresponds to a maximum output power, defines the output power (P) as a function of the engine's speed of revolution ($\omega$), has an ascending part (12) at low speeds of revolution and a descending part (11) at high speeds of revolution, characterised in that if, when the engine (1) is operating, the speed of revolution exceeds a first upper limiting value ($\omega_{max,0}$) at the value of the controlling parameter which corresponds to the maximum output power, a first value ($T_1(\omega)$) of the controlling parameter (T) is set which corresponds to a reduced output power.

4. Method according to claim 3, characterised in that the first value ($T_1(\omega)$) of the controlling parameter which corresponds to a reduced output power is a function of the speed of revolution ($\omega$) of the engine, and in that the function is preset in order to obtain a decrease in engine output power (P) as the speed of revolution rises ($\omega$).

5. Method according to claim 3, characterised in that if, when operating with the first reduced value ($T_1(\omega)$) of the controlling parameter, the speed of revolution drops below a first lower limiting value ($\omega_{min,1}$) for speed of revolution, the value of the controlling parameter which corresponds to the maximum output power is set.

6. Method according to claim 5, characterised in that, at the same speed of engine revolution ($\omega$), the difference between the output power from the engine at the value of the controlling parameter which corresponds to the maximum output power and that at the first value ($T_1(\omega)$) which corresponds to reduced output power and/or the difference between the output power from the engine at the nth value ($T_n(\omega)$) of the controlling parameter and at its n+1th value ($T_{n+1}(\omega)$) differ by at least 10 kW.

7. Method according to claim 5, characterised in that the nth lower limiting value ($\omega_{min,n}$) is a maximum of 90% of the n+1th upper limiting value ($\omega_{max,n}$).

8. Method according to claim 3, characterised in that if, when operating with the nth value ($T_n(\omega)$) of the controlling parameter, an n+1th upper limiting value ($\omega_{max,n}$) for speed of revolution is exceeded, an n+1th value ($T_{n+1}(\omega)$) of the controlling parameter which corresponds to a reduced output power is set, where n may be any whole-number value between 1 and an upper limit.

9. Method according to claim 3, characterised in that if, when operating with the n+1th value ($T_{n+1}(\omega)$) of the controlling parameter, the speed of revolution drops below an n+1th lower limiting value ($\omega_{min,n+1}$) for speed of revolution, the nth value ($T_n(\omega)$) of the controlling parameter which corresponds to a reduced output power is set, where n may be any whole-number value between 1 and an upper limit.

10. Method according to claim 3, characterised in that the controlling parameter is the torque generated by the engine.

* * * * *